United States Patent

[11] 3,586,892

| [72] | Inventor | Suguru Sato<br>Kariya-Sho, Japan |
|---|---|---|
| [21] | Appl. No. | 844,309 |
| [22] | Filed | July 24, 1969 |
| [45] | Patented | June 22, 1971 |
| [73] | Assignee | Nippon Denso Kabushiki Kaisha<br>Kariya-shi, Japan |
| [32] | Priority | Sept. 24, 1968 |
| [33] | | Japan |
| [31] | | 43/82772 |

[54] AC CAR DYNAMO
3 Claims, 7 Drawing Figs.

[52] U.S. Cl................................................... 310/68,
510/239
[51] Int. Cl....................................................H02k 11/00

[50] Field of Search............................................. 310/67, 68,
68.4, 168, 70, 71, 239, 263

[56] References Cited
UNITED STATES PATENTS

| 3,329,841 | 7/1967 | Binder et al. ................. | 310/68 |
| 3,496,394 | 2/1970 | Balcke et al. ................. | 310/68 |
| 3,378,708 | 4/1968 | Baker........................... | 310/68 |

Primary Examiner—D. F. Duggan
Attorney—Cushman, Darby & Cushman

ABSTRACT: An AC dynamo in which a rectifier, a voltage regulator and brush holders are disposed in stacked relationship, all these elements being secured to an end bracket of the dynamo by common securing means which provide electrical connection means between the elements as well as serve as electrical terminal means.

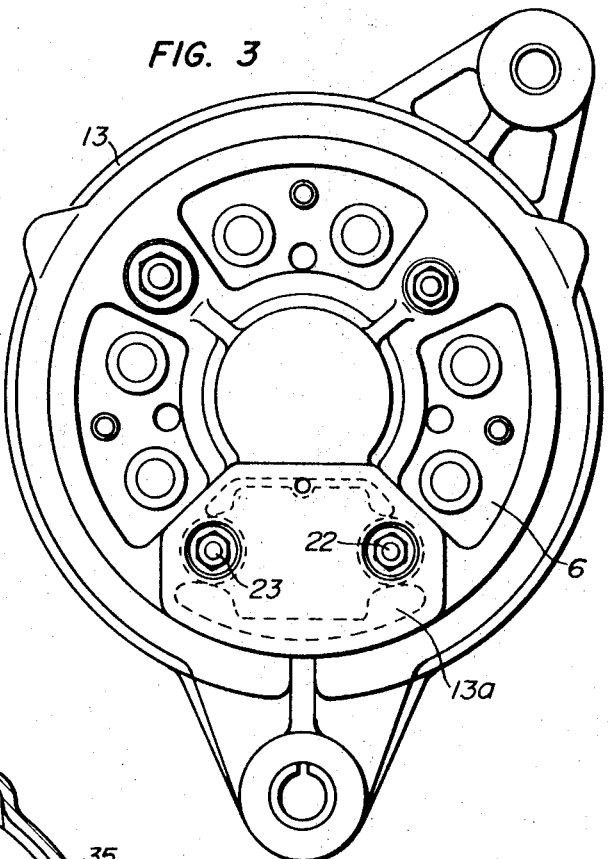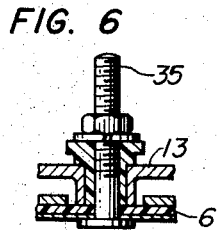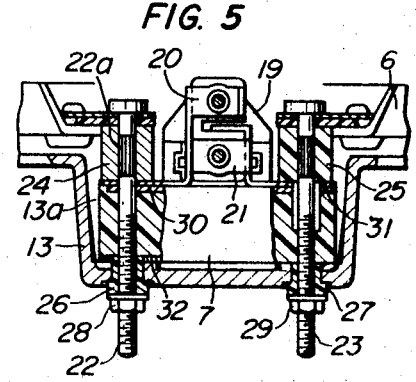

AC CAR DYNAMO

BACKGROUND OF THE INVENTION

1. Field of the Invention

This invention generally relates to an AC car dynamo, and more particularly to an AC dynamo incorporating a rectifier to convert the AC output of the AC dynamo into a direct current and a voltage regulator, which is used in a car battery charging equipment to charge the battery with a direct current at a fixed voltage.

2. Description of the Prior Art

In the hereto ore known dynamos of this type, it had usually been the practice to secure a rectifier and a voltage regulator to the inner and outer walls of the end bracket of the dynamo by means of respective securing members. Such a construction, however, involve various disadvantages such as the need for more locking members to be used and accordingly more man-hours for assembling, which finally result in the high cost of the assembled product.

SUMMARY OF THE INVENTION

It is therefore an object of the present invention to provide an AC car dynamo which comprises a rectifier, a voltage regulator and brush holders all disposed in stacked relationship, all of said elements being secured to the end bracket of said dynamo by common securing means.

Thus, according to the present invention, the number of securing members required to mount the components can be greatly reduced.

It is another object of the present invention to provide an AC car dynamo in which the common securing members provide electrical connection means between the said elements and also serve as electrical terminal means such as a terminal for a lead to a charge indicator lamp.

Thus, according to the present invention, the required member of connection members and terminal members can also be greatly decreased, which in turn results in a great reduction of the assembling man-hours and accordingly in a much lower cost of the manufactured battery charging equipment.

BRIEF DESCRIPTION OF THE DRAWINGS

The present invention will now be described more fully in conjunction with the accompanying drawings, in which:

FIG. 3 is an end view seen in the direction of the arrow III in FIG. 2;

FIG. 4 is a detailed sectional view taken along line IV–IV of FIG. 2;

FIG. 5 shows a cross section of the essential portion of the invention taken along line V–V of FIG. 4;

FIG. 6 is a sectional view of a portion of the dynamo taken along line VI–VI of FIG. 4; and FIG. 7 is a sectional view of another portion taken along line VII–VII of FIG. 4.

DESCRIPTION OF THE PREFERRED EMBODIMENT

Figure 1:
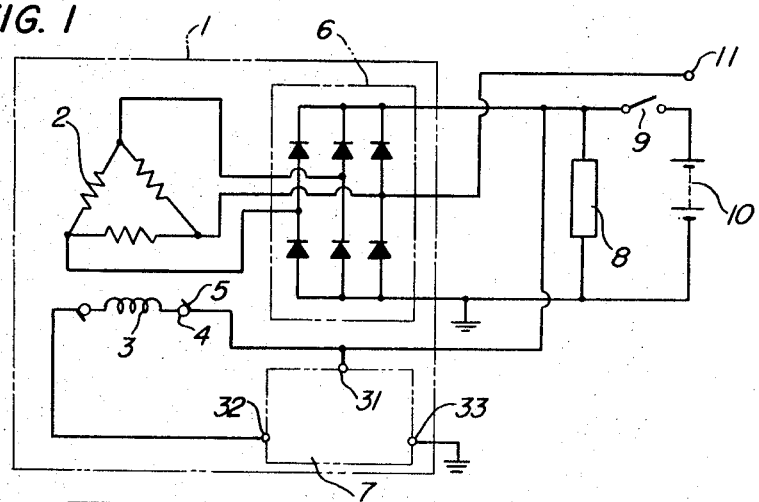
FIG. 1 is an electrical circuit diagram of the battery charging equipment including the AC car dynamo according to the present invention.
Figure 2:
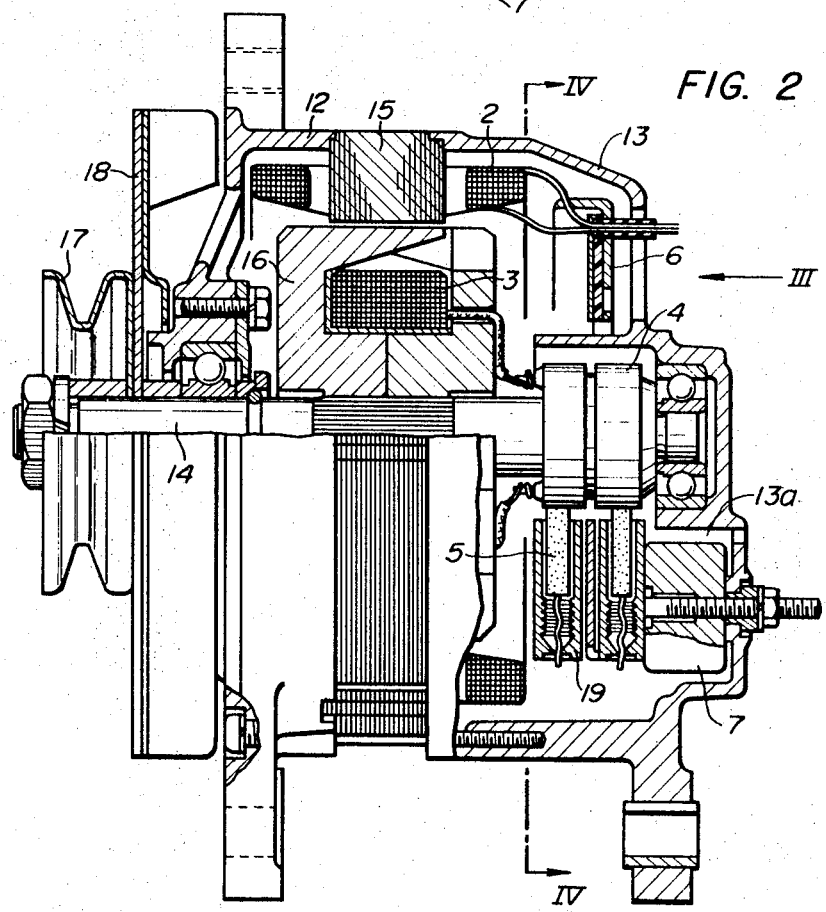
FIG. 2 is a longitudinal sectional view of the AC dynamo of the present invention.

Referring to FIG. 1, the electrical circuit of the battery charging equipment incorporates an AC dynamo 1 according to the present invention, which comprises a stator winding 2, a rotary exciting winding 3, slip rings 4, brushes 5, a full-wave rectifier 6 for rectification of the AC voltage produced in the stator winding 2, and a voltage regulator 7. The circuit of the battery charging equipment further includes various loads 8 in the the car, a key switch 9, a car battery 10, and a terminal 11 for connecting a charge indicator lamp. The battery charging equipment thus constructed has no difference in operation from any conventional equipment of the same type, but the invention is present in the features described hereunder.

Description will now be made in detail of the present invention with reference to FIGS. 2 to 7. As shown, there are provided end brackets 12 and 13 to cover the AC dynamo 1, and a main shaft 14 extending through the dynamo. Interposed between the end brackets 12 and 13 is an iron core 15 having the stator winding 2 wound thereon. A pawl-shaped core 16 for holding the rotary exciting winding 3 and slip rings 4 are fitted on the rotating shaft 14. A pulley 17 and a cooling fan 18 are also fitted on the rotating shaft 14 at an end thereof and outside the bracket. A recess 13a is formed in the end bracket 13 for accommodating the voltage regulator 7 therein. Brush holder 19 are provided so as to securely receive the brushes 5 therein, and as best shown in FIG. 5, the brush holders 19 are provided with support arms 20 and 21 which also serve as the terminal plates electrically connected with the respective brushes 5. Provided further are terminal bolts 22 and 23, a metallic collar 24 and an insulator collar 25. The rectifier 6, the support arms 20 and 21 of the brush holders 19, and the voltage regulator 7 are assembled in stacked relationship, and this assembly is secured to the end bracket 13 through insulator bushings 26 and 27 by means of terminal bolts 22 and 23 and nuts 28 and 29, as shown in FIG. 5. The metallic collar 24 and the insulator collar 25 are interposed between the rectifier 6 and the support arms 20 and 21 of the brush holders 19, the metallic collar 24 being tightly fitted on the bolt 22 with the knurled portion 22a of the bolt 22.

The voltage regulator 7 comprises semiconductor elements such as transistors and other components formed in an integrated circuit, and has three electrical terminals 30, 31 and 32 exposed outside thereof. The electrical terminals 30 and 31 are in contact with the support arms 20 and 21 of the brush holders 19 respectively and the other terminal 32 is in contact with the end bracket 13 to provide a ground potential.

With the above-described arrangement, the elements of the rectifier 6, the brush holders 19 and the voltage regulator 7 which are to be at the same potential are electrically connected together through the terminal bolt 22 and the metallic collar 24. Further, a rivet 33 (FIG. 4) is provided to lead respectively, potential at one of the AC terminals of the rectifier 6 to the terminal bolt 23 therethrough. The terminal bolt 23 is electrically separated from the voltage regulator 7 and brush holders 19 by the insulator collar 25 and it corresponds to the terminal 11 for connecting the charge indicator lamp shown in FIG. 1.

In FIG. 4, bolt 34 is a ground terminal and 35 a DC output terminal, both serving as securing bolts for the rectifier 6.

I claim:

1. An AC car dynamo comprising:
    a voltage regulator,
    brush holders,
    rectifier means,
    an end bracket,
    said regulator, holders, and rectifier means being disposed in a stacked relationship,
    common securing means for pressing said regulator, said brush holders and said rectifier means together against said end bracket,
    said common securing means being electrically connected to at least one of said regulator, said brush holders and said rectifier means, and
    said common securing means also providing electrical terminal means for connection to a charge indicator lamp.

2. An AC car dynamo comprising:
    a voltage regulator,
    brush holders,
    rectifier means,
    an end bracket,
    said regulator, holders, and rectifier means being disposed in a stacked relationship,
    common securing means for pressing said regulator, said brush holders and said rectifier means together against said end bracket, said voltage regulator, said brush holders, said rectifier means and said end bracket each having at least one aperture therethrough, and said common securing means comprising at least one threaded bolt passing through all of said apertures for securing said regulator, holders and rectifier means together in a stacked relationship against said end bracket.

3. An AC car dynamo comprising:
a voltage regulator,
brush holders,
an output rectifier means,
an end bracket,
at least parts of said regulator, said brush holders, and said rectifier means being disposed in a mutually stacked relationship, and
common securing means for pressing said regulator, said brush holders and said rectifier means together against said end bracket and for also providing an electrical connection to at least one of said regulator, said brush holders and said rectifier means.